United States Patent
Sereni et al.

(10) Patent No.: US 8,424,178 B2
(45) Date of Patent: Apr. 23, 2013

(54) JIG FOR MOUNTING A STACK OF BELLEVILLE SPRINGS

(75) Inventors: Eugenio Sereni, Modena (IT); Johannes Diels, Grobbendonk (BE); Arie Niemantsverdriet, Sint Jansteen (NE); Matteo Venturelli, Serramazzoni (IT)

(73) Assignee: CNH America LLC ( * ) Notice: Subject to any disclaimer, the term of this patent is extended or adjusted under 35 U.S.C. 154(b) by 0 days.

(21) Appl. No.: 13/438,309

(22) Filed: Apr. 3, 2012

(65) Prior Publication Data
US 2012/0291244 A1 Nov. 22, 2012

Related U.S. Application Data

(62) Division of application No. 12/184,139, filed on Jul. 31, 2008, now Pat. No. 8,166,626.

(30) Foreign Application Priority Data

Aug. 2, 2007 (EP) .................................... 07425504

(51) Int. Cl.
  *B23P 19/04* (2006.01)
  *B23Q 3/00* (2006.01)
(52) U.S. Cl.
  USPC ............. 29/229; 29/271; 29/281.1; 29/281.5; 29/467; 29/464
(58) Field of Classification Search .................... 29/467, 29/464, 466, 468, 446, 452, 225, 226, 229, 29/230, 271, 281.1, 281.5
See application file for complete search history.

(56) References Cited

U.S. PATENT DOCUMENTS

| | | | | |
|---|---|---|---|---|
| 1,826,597 A * | 10/1931 | Brecht | .......................... | 267/162 |
| 2,020,927 A * | 11/1935 | Arnold et al. | ................. | 267/162 |
| 3,010,713 A * | 11/1961 | Turkovich | ..................... | 267/162 |
| 3,873,079 A * | 3/1975 | Kuus | .............................. | 267/162 |
| 4,040,284 A * | 8/1977 | Fuchs, Jr. | ........................ | 72/272 |
| 4,187,597 A * | 2/1980 | Bremer, Jr. | .................. | 29/281.3 |
| 4,723,352 A * | 2/1988 | Connolly et al. | .......... | 29/525.11 |
| 5,014,422 A * | 5/1991 | Wallis | ....................... | 29/890.044 |
| 5,538,121 A * | 7/1996 | Hering | ........................ | 192/70.12 |
| 5,669,598 A * | 9/1997 | Ticey et al. | .................... | 267/162 |
| 6,557,234 B1 * | 5/2003 | Hagiwara et al. | ............... | 29/433 |
| 6,643,907 B2 * | 11/2003 | Hagiwara et al. | ............... | 29/433 |
| 7,621,514 B2 * | 11/2009 | Okubo et al. | ................... | 269/24 |
| 7,854,425 B2 * | 12/2010 | Evans | .......................... | 267/162 |

(Continued)

FOREIGN PATENT DOCUMENTS

EP  2023004 A1 * 2/2009
JP  60113829 A * 6/1985

*Primary Examiner* — Essama Omgba
(74) *Attorney, Agent, or Firm* — Sue C. Watson

(57) ABSTRACT

The invention relates to mounting of a stack of Belleville springs about a shaft. The individual springs of the stack are first positioned over the shaft. A jig is then placed over the shaft and the springs and has at least one axially extending pressure bar that is radially inwardly biased to urge the inner circumferences of all the springs into contact with axially aligned points on the surface of the shaft. The springs are then compressed using a compression element while they are still urged by the pressure bar against the shaft. Finally, to retain the springs on the shaft and maintain the springs in compression, a split retaining clip is pressed onto to the shaft until it engages in a groove.

5 Claims, 2 Drawing Sheets

U.S. PATENT DOCUMENTS

| | | | |
|---|---|---|---|
| 7,963,502 B2 * | 6/2011 | Lovell et al. | 251/214 |
| 8,166,626 B2 * | 5/2012 | Sereni et al. | 29/467 |
| 2002/0152602 A1 * | 10/2002 | Relan et al. | 29/464 |
| 2007/0138720 A1 * | 6/2007 | Evans | 267/162 |
| 2008/0047616 A1 * | 2/2008 | Lovell et al. | 137/315.28 |
| 2008/0116623 A1 * | 5/2008 | Crocker et al. | 267/169 |
| 2009/0033010 A1 * | 2/2009 | Sereni et al. | 267/162 |
| 2010/0126012 A1 * | 5/2010 | Ishikawa | 29/888.02 |
| 2011/0049777 A1 * | 3/2011 | Evans | 267/162 |
| 2012/0210577 A1 * | 8/2012 | Ishikawa | 29/888.02 |

* cited by examiner

JIG FOR MOUNTING A STACK OF BELLEVILLE SPRINGS

CROSS-REFERENCE TO RELATED APPLICATIONS

This present application is a divisional application of U.S. patent application Ser. No. 12/184,139 filed Jul. 31, 2008, now U.S. Pat. No. 8,166,626, issued May 1, 2012, by Eugenio Sereni, Johannes Diels, Arie Niemantsverdriet, and Matteo Venturelli, entitled "A METHOD AND A JIG FOR MOUNTING A STACK OF BELLEVILLE SPRINGS", which is hereby incorporated by reference herein in its entirety for all purposes, which claims priority under 35 U.S.C. 119(a)-(e) or 365(b)-(c) to foreign application number EP 07.425.504.3, filed Aug. 2, 2007, by Eugenio Sereni, Johannes Diels, Arie Niemantsverdriet, and Matteo Venturelli, entitled "A METHOD AND A JIG FOR MOUNTING A STACK OF BELLEVILLE SPRINGS", which is also hereby incorporated by reference herein in its entirety for all purposes.

FIELD OF THE INVENTION

The present invention relates to a method and a jig for mounting a stack of Belleville springs.

BACKGROUND OF THE INVENTION

In many applications where a large spring force is needed, such as in clutches employed in agricultural vehicles, coil springs have limited use because of the space that they need. Furthermore, coil springs present a variable spring rate, the force required to deflect the springs increasing as the deflection increases.

Frustro-conical spring discs or so-called Belleville springs are not only capable of having very high strength for the space occupied, but can be constructed and preloaded to have a constant spring rate. When Belleville springs are assembled in coaxial stacks, in peripheral engagement, the inner and outer circumferences of the springs need to be correctly aligned during installation to maintain concentricity. Incorrect centering can result in hysterysis which renders the spring system faulty or non-uniform in its operation.

Hysterysis can be understood from a consideration of a graph plotting spring force against displacement as the stack of springs is first compressed then allowed to expand. Ideally, both during the compression and the expansion parts of this cycle, the spring force at any given displacement should be the same and the graph should simply track up then down the same line. In practice, however, the graph follows a closed loop, not a single line, and the greater the hysterysis, the greater the area enclosed by the loop.

Hysterysis is caused by friction as the edges of the springs rub and slide against one another instead of the lines of contact acting as pivots. To minimize hysterysis losses and wear, the springs in a stack need therefore to be correctly aligned.

U.S. Pat. No. 1,826,597, U.S. Pat. No. 2,020,927, U.S. Pat. No. 3,010,713 and U.S. Pat. No. 3,873,079 use different arrangements of spacer rings between the individual springs in a stack to retain them in concentric relationship. There is however no need for this complication because, once correctly installed, the springs remain permanently under compression and do not tend to move relative to one another. It is thus only during initial installation that special care is required to align them with one another and such alignment has previously been carried out by eye. Even if the individual springs are correctly placed one above the other, it is not certain that they will remain aligned when they are compressed during their installation about a cylindrical shaft or within a cylindrical bore.

SUMMARY OF THE INVENTION

According to a first aspect of the present invention, there is provided a method of mounting a stack of Belleville springs about a shaft which comprises positioning individual springs over the shaft, placing over the shaft and the springs a jig having at least one axially extending pressure bar that is radially inwardly biased to urge the inner circumferences of all the springs into contact with axially aligned points on the surface of the shaft, compressing the springs while they are urged by the pressure bar against the shaft and fitting a retaining clip to the shaft to retain the springs on the shaft and maintain the springs in compression.

According to a second aspect of the present invention, there is provided a method of mounting a stack of Belleville springs within a cylindrical bore which comprises positioning individual springs in the bore, placing within the springs a jig having at least one axially extending pressure bar that is radially outwardly biased to urge the outer circumferences of all the springs into contact with axially aligned points on the surface of the bore, compressing the springs while they are urged by the pressure bar against the bore and fitting a retaining clip to the bore to retain the springs in the bore and maintain the springs in compression.

It will be readily appreciated that the first two aspects of the invention are analogous to one another, both relying on the springs being pressed against the element to which they are being fitted while applying a force to compress them.

While a single pressure bar could suffice, improved alignment is achieved by using two tangentially spaced pressure bars to force points on the springs radially midway between the two pressure bars to be pressed against the shaft or the bore.

According to a third aspect of the invention, there is provided a jig for mounting a stack of Belleville springs about a shaft, which comprises a guide element, an alignment element and a compression element, the guide element having a conical surface to guide the individual springs and a retaining clip onto the end of the shaft, the alignment element having at least one axially extending pressure bar that is radially inwardly biased to urge the inner circumferences of all the springs into contact with axially aligned points on the surface of the shaft, and the compression element including an annulus for compressing the springs while they are urged by the pressure bar of the alignment element against the shaft and for urging the retaining clip onto the shaft after the springs have been compressed to retain the springs on the shaft and maintain the springs in compression.

According to a fourth aspect of the invention, there is provided a jig for mounting a stack of Belleville springs in a bore, which comprises a guide element, an alignment element and a compression element, the guide element having a conical surface to guide the individual springs and a retaining clip into the end of the bore, the alignment element having at least one axially extending pressure bar that is radially outwardly biased to urge the outer circumferences of all the springs into contact with axially aligned points on the surface of the bore, and the compression element including an annulus for compressing the springs while they are urged by the pressure bar of the alignment element against the bore and for urging the retaining clip into the bore after the springs have been compressed to retain the springs in the bore and maintain the springs in compression.

Preferably, the alignment element comprises two tangentially spaced pressure bars.

The end of the annulus of the compression element is conveniently formed with a recess or shoulder so as only to slide the retaining clip into its associated seat after the springs have been fully compressed.

BRIEF DESCRIPTION OF THE DRAWINGS

The invention will now be described further, by way of example, with reference to the accompanying drawings, in which.

DESCRIPTION OF THE PREFERRED EMBODIMENT(S)

Figure 1:
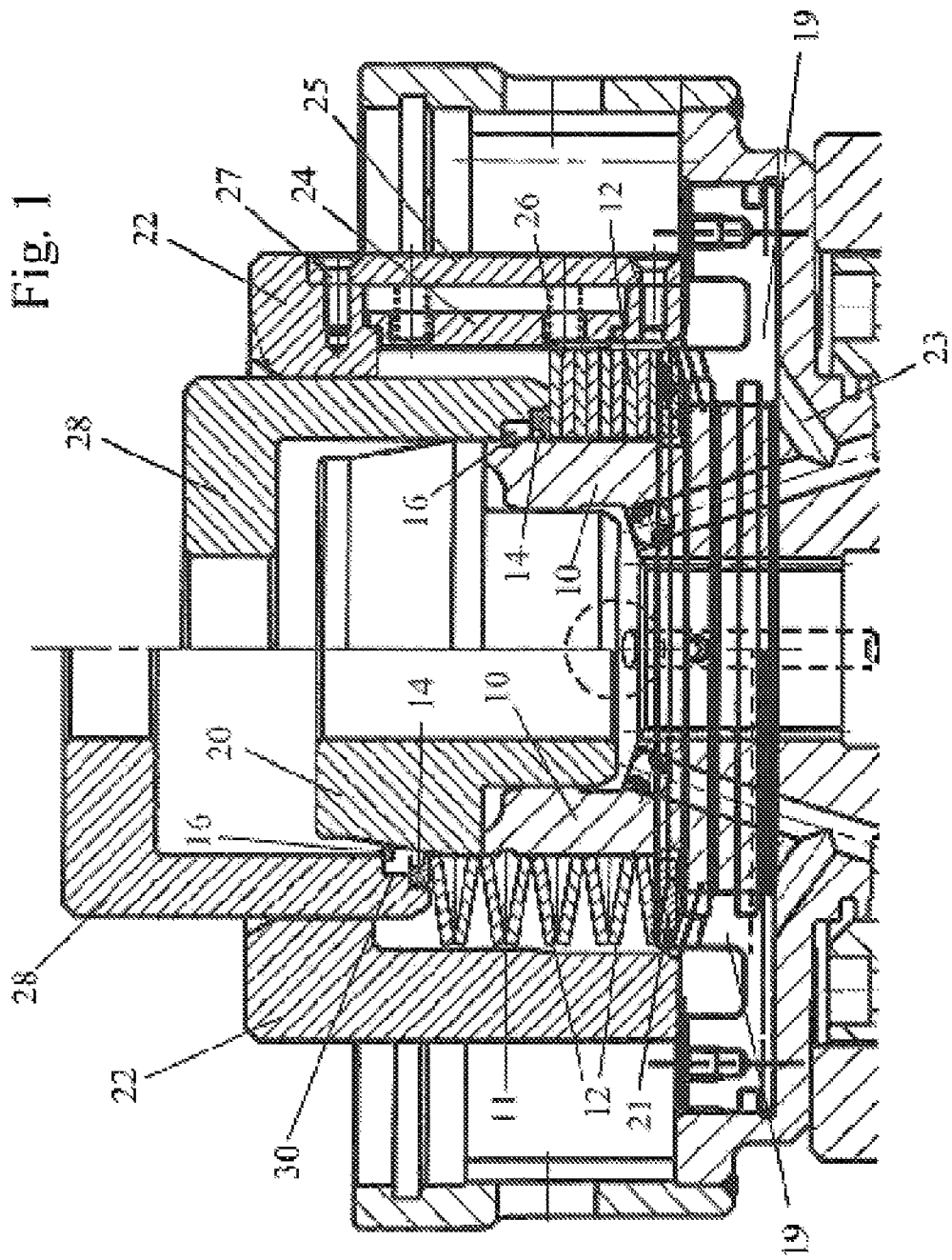
FIG. 1 is a section showing a jig being used to mount Belleville springs on a shaft that forms part of a clutch in a gearbox of an agricultural vehicle.

FIG. 1 shows a shaft 10 onto which it is desired to mount a stack of Belleville springs 12. After an abutment plate 21 and the springs 12 have been fitted over the shaft 10 and compressed, a plate ring 14 is placed over them and they are held in place by pushing a split ring 16, also known as a Seeger ring, over the end of the shaft 10 until it springs into a groove 11 in the shaft 10. The left hand side of the drawing shows the various components immediately prior to their assembly and the right hand side of the drawing shows the same components after assembly has been completed.

The shaft 10 and the Belleville springs 12 form part of a hydraulically operated clutch of a transmission of an agricultural vehicle. In operation of the clutch, the springs 12 are compressed by a piston 19 to which hydraulic fuel is supplied by way of bores 23 in the shaft. A set of clutch plates (not shown) provided radially outwardly of the Belleville springs, are also pressed together by the piston 19 when the clutch is engaged. As the operation of the clutch is of no particular relevance to the present invention, the other components of the clutch that can be seen in the drawing will not be described in detail. It should in particular be stressed that such a clutch provides only one example of a mechanism in which a stack of Belleville springs needs to be mounted on a shaft.

To ensure proper alignment of the Belleville springs during their installation, a jig is used which is composed of three elements, namely a guide element 20, an alignment element 22 and a compression element 28. These are placed over the end of the shaft 10 in the sequence now to be described and a press (not shown) is then brought down onto the compression element to complete the installation of the Belleville springs 12.

The guide element 20 is a tapered cylinder that is first fitted to the end of the shaft 10. The abutment plate 21 and individual springs 12 are then slipped over the guide element 20 onto the end of the shaft 10 with the correct orientation. The conical guide element 20 enables this task to be carried out speedily. As the height of the stack of springs 12, prior to compression, is greater than the length of the end of the shaft 10, the guide element 20 also helps centre those springs which cannot yet be placed over the shaft 10.

After the springs 12 have been positioned, a ring plate 14 is placed over the uppermost spring 12 and the Seeger ring 16 is positioned on the guide element 20 above the ring plate 14. The Seeger ring 16 needs to be expanded radially to fit over the end of the shaft and at this stage it can only be placed manually on the tapering part of the guide element 20.

With the various components positioned in the manner shown on the left in the accompanying drawing, the alignment element 22 is slipped over the springs 12. The alignment element 22 comprises an annular body having at two locations on its inner circumference, positioned 90° apart, axially extending pressure bars 24. Each pressure bar 24 is inserted radially from the outside into a respective axial slot in the annular body and is retained by a cover plate 25 that is secured to the annular body by screws 27. Springs 26 acting between the cover plate 25 and the pressure bar 24 urge the bar 24 radially inwards and the bar 24 is retained in the slot by shoulders at each which allow only part of each bar to protrude beyond the inner cylindrical surface of the annular body of the alignment element 22.

Figure 2:
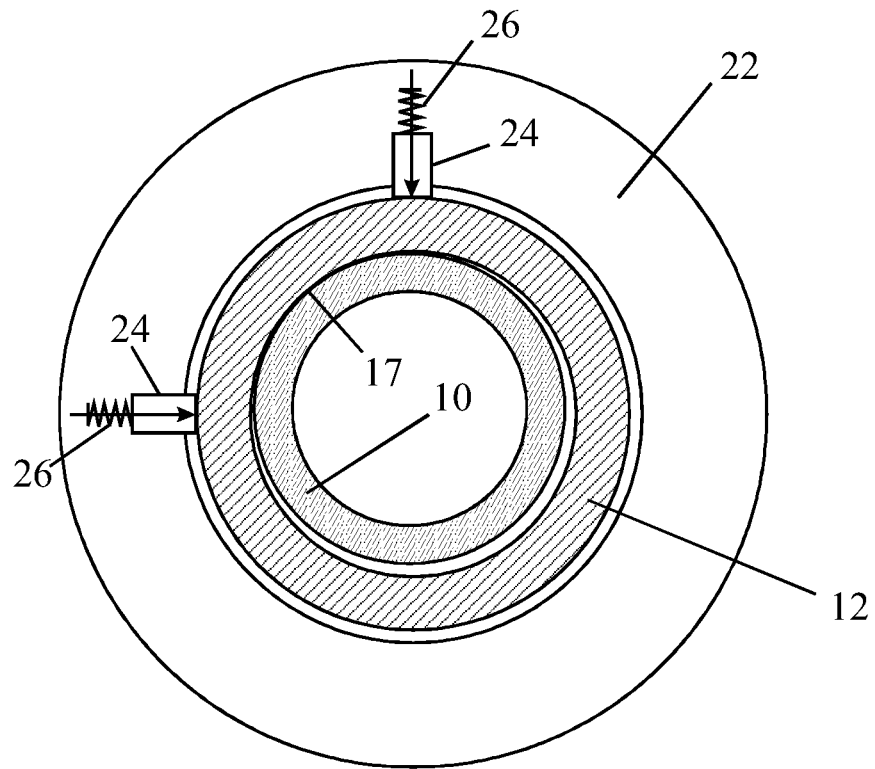
FIG. 2 is a schematic diagram showing the manner in which the springs are pressed against the shaft during their installation.

As better shown in FIG. 2, when fitted over the springs 12, the two pressure bars 24 push the springs 12 against the outer surface of the shaft and the inner circumference of each spring 12 makes contact with the surface of the shaft 10 at a point 17 radially midway between the two pressure bars 24. The springs 12 are in this way forced into a position in which their inner and outer circumferences are exactly centered on one another.

While the springs 12 are held in place in this manner, the compression element 28 is positioned over the springs 12. The compression element 28 includes an annulus having a stepped lower end 30. A first step engages the Seeger ring 16, a second engages the plate ring 14 and the axial end of the annulus engages the upper most spring 12.

Using the press, the compression element 28 is moved down to the position shown on the right in the drawing. During this movement, the compression element 28 compresses the springs 12 and lower the plate ring 14 onto the compressed springs. The compression element 28 also picks up the Seeger ring 16 and expands it by sliding it over the conical part of the guide element 20. The Seeger ring 16 is then slid over the end of the shaft 10 and, shortly before the springs are fully compressed, the Seeger ring 16 reaches the groove 11 and snaps into place by virtue of its own resilience. The Seeger ring 16 fits with clearance in its groove 11 which allows the compression elements to be lowered a little further so as to ensure that the Belleville springs 12 are fully compressed.

Although the Belleville springs 12, during normal operation of the clutch, are never compressed fully, it has been found that full compression of the springs 12 during the installation process until they are lying flat against one another further reduces hysterysis of the clutch.

As the compression element 28 is then raised, the stack of springs 12 expands pushing the plate ring 14 up until it reaches the Seeger ring 16. The latter now sits in a recess in the plate ring and is prevented from expanding and escaping from the groove 11.

The stack of springs 12 is now correctly aligned and installed and the individual springs will remain correctly centered on one another during normal operation of the clutch.

Figure 3:
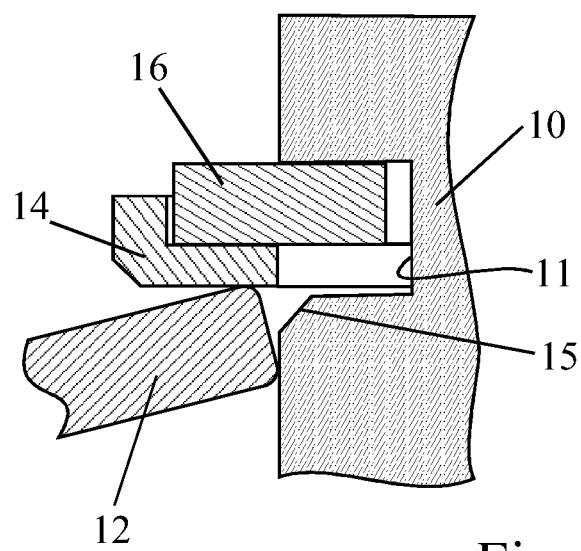
FIG. 3 is a section through a detail of the shaft showing the groove for receiving the retaining ring of the springs.

To avoid the risk of the individual springs 12 snagging on the groove 11 during their installation, it is preferred, as shown in FIG. 3, to provide a chamfer 15 on the lower of the two shoulder defining the groove 11. Such chamfering does not impair the retention of the Seeger ring 16 which in use is urged against the opposite shoulder.

The embodiment of the invention shown in the drawing is one in which the springs 12 are fitted over a shaft. It will however be clear to the person skilled in the art that an analogous method of installation and jig can be used if mounting a stack of Belleville springs within a cylindrical bore. In this case, the guide element would be a funnel rather than a cone guiding the springs 12, the plate ring and the Seeger ring into the bore. The alignment element would be a cylinder that fits within the stack of springs with two outwardly biased pressure bars acting on the inner circumferences of the springs to urge their outer circumferences against the surface of the bore. The compression element would comprise an annulus to fit around the alignment element and within the bore but the shoulders acting on the plate ring and the Seeger ring would be on the outside rather than the inside of the annulus.

Having thus described the invention, what is claimed is:

1. A jig for mounting a stack of Belleville springs about a shaft, comprising:
    a guide element in a ring plate;
    a Seeger ring positioned above the ring plate;
    an alignment element;
    a compression element; and
    springs;
    the shaft having a groove in a surface thereof, the springs positioned over the shaft, and the ring plate positioned next to an upper most spring;
    the guide element having a conical surface shaped to guide the individual springs;
    the alignment element having at least one axially extending pressure bar that is radially inwardly biased to urge an inner circumferences of all the springs into contact with axially aligned points on the surface of the shaft; and
    the compression element having an annulus shaped for compressing the springs while they are urged by the pressure bar of the alignment element against the shaft, the compression ring configured to urge the Seeger ring, the plate ring, and the springs downward during compression, such that when compressed, an outer edge of the Seeger ring is positioned in the groove of the shaft while an inner edge of the Seeger ring is positioned in the guide element of the plate ring, at least a portion of the guide element and the Seeger ring extending over the springs, such that the springs are retained in at least a partially compressed positioned via the position of the Seeger ring in both the groove of the shaft and the guide element of the plate ring after the compression element is moved away.

2. The jig of claim 1, wherein the alignment element comprises two tangentially spaced pressure bars.

3. The jig of claim 2, wherein the two tangentially spaced pressure bars are used to force points on the springs radially midway between the two pressure bars to be pressed against the shaft.

4. The jig of claim 1, wherein the end of the annulus of the compression element is formed with a recess or shoulder in order to push the Seeger ring into position after the springs have been compressed.

5. The jig of claim 1, wherein the jig further comprises an abutment plate positioned over the shaft and below the springs.

* * * * *